United States Patent Office 3,318,153
Patented May 9, 1967

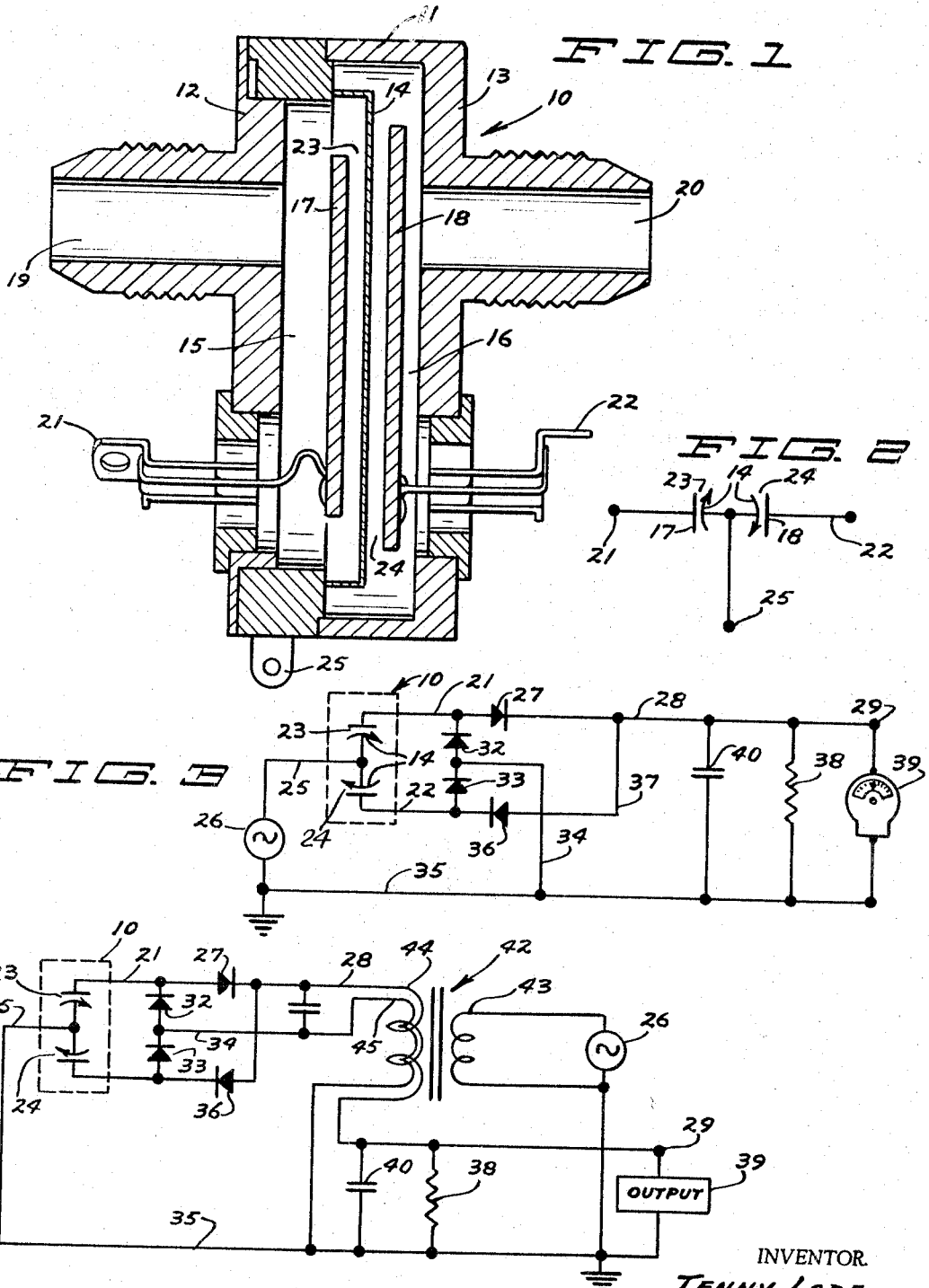

3,318,153
DIODE LOOP CAPACITOR COMPARATIVE CIRCUIT INCLUDING A PAIR OF TRANSFORMER WINDINGS COUPLED IN PHASE
Tenny Lode, Madison, Wis., assignor to Rosemount Engineering Company, Minneapolis, Minn., a corporation of Minnesota
Original application Dec. 4, 1962, Ser. No. 242,166, now Patent No. 3,271,669, dated Sept. 6, 1966. Divided and this application May 16, 1966, Ser. No. 550,548
10 Claims. (Cl. 73—398)

This application is a division of my application Ser. No. 242,166, filed Dec. 4, 1962, now Patent No. 3,271,669.

This invention has relation to circuits for the precise comparison and measurement of small capacitances and small changes in capacitance. In circuits constructed according to the invention, high frequency voltages are supplied across two or more such capacitive elements to be measured and compared, and the resulting high frequency currents flowing in these elements are subjected to rectification and are combined, the resulting circuit outputs being functions of these rectified D.C. or low frequency currents and, therefore, functions of the capacitances being compared.

Transducers or sensor gages have been developed which measure pressure in terms of two electrical capacitances. Such transducers can have two spaced apart, fixed, parallel condenser plates and a movable condenser plate situated therebetween, this movable plate taking the form of a thin flexible metal diaphragm separating two pressure chambers in each of which one of the fixed plates is situated. Any difference in pressure between the chambers will cause the diaphragm to deflect toward the lower pressure, thereby changing the electrical capacitances between the diaphragm and the two fixed plates.

The accurate measurement of the relatively small capacitance differences which are developed in the use of such a gage with the circuits available before this invention presented certain problems. For example, capacitors in the desired working range of capacitance must be measured either as high impedances at moderate frequencies, such as 400 cycles per second, or must be measured at higher frequencies. The measurement of high impedances may be difficult because of problems of stray circuit impedances, such as undesired capacitances between various portions of the measuring circuit and to ground. Previously known high frequency bridge circuits suffer either from excessive error, undesirable complexity if manual balancing is to be avoided, or both. It is an object of this invention to overcome these problems.

Among the objects of the invention are the following:
(1) To provide a capacitance measurement circuit yielding directly a D.C. or low frequency output;
(2) To provide a capacitance measurement circuit which is insensitive to stray capacitances to ground;
(3) To provide a capacitance measurement circuit which can be used to precisely compare two or more capacitances with each other; and
(4) To provide circuit means whereby any one of a number of different output voltage and current function of one or more variable capacitances can be generated as desired.

While the invention is described herein in relationship to a pressure sensitive transducer, it is to be understood that other capacitances can be compared and measured with equal facility; the particular embodiments being by way of example only. Many other variations will be possible within the spirit of the invention and the scope of the claims which follow.

In the drawings,
FIG. 1 is a vertical sectional view of one form of device which can be used in connection with the circuits of the invention, and as shown, this device is an electromechanical transducer for measuring pressure in terms of electrical capacitance;
FIG. 2 illustrates the equivalent electrical circuit of the transducer of FIG. 1 and the equivalent electrical circuit of many other capacitances which can be measured and compared using the circuit of the invention;
FIG. 3 illustrates a basic circuit of the invention; and
FIG. 4 illustrates a modification of FIG. 3 which allows the center plate of the two capacitances to be grounded for mechanical convenience.

Referring now to the drawings and the numerals of reference thereon, a representative capacitive pressure gage 10 as shown in FIG. 1 includes a gage body 11 which consists of first and second complementary gage body portions 12 and 13, respectively, separated by a thin flexible diaphragm 14 to define first and second pressure chambers 15 and 16, within said first and second body portions, respectively. First and second fixed plates 17 and 18 are situated within the first and second pressure chambers 15 and 16 respectively, to have parallel spaced relationship to the thin flexible diaphragm 14. First and second pressure inlet conduits 19 and 20 are open from outside of the gage body 11 to the first and second pressure chambers 15 and 16, respectively. First and second electrical connections 21 and 22 extend from the first and second fixed plates 17 and 18 respectively and are insulated from electrical connection with the case body 11 and the flexible diaphragm 14.

Any difference in the chamber pressures will cause the diaphragm 14 to deflect toward the chamber of the lower pressure; thereby changing the electrical capacitances between the diaphragm and the two fixed plates 17 and 18. Such a gage is used as a differential pressure gage by connecting the two pressure conduits to the two pressures to be compared. The gage is used as an absolute pressure gage by sealing one of the conduits 19 and 20 with a vacuum or reference pressure inside of its corresponding pressure chamber and connecting the other conduit to the pressure to be measured. Typical gages can have midrange capacitances of approximately 40 picofarads between the diaphragm 14 and each of the two fixed plates 17 and 18. At a nominal full scale pressure difference, the capacitances of such gages will be approximately 34 picofarads on one side and 56 on the other. Expressing the gage output as the difference in the capacitances to the fixed plates, the normal full scale range from lowest to highest value is approximately plus or minus 20 picofarads.

For purposes of simplicity in discussing the circuits which follow, the first fixed plate 17 and the flexible diaphragm 14 can be considered a first variable capacitor or capacitor pair 23 and the second fixed plate 18 and the diaphragm 14 can be thought of as a second variable capacitor or capacitor pair 24. A third electrical connection 25 extends from the thin flexible diaphragm 14 and, as shown, is grounded to the gage body 11, but this is not always necessary. The diaphragm 14 and the electrical connection 25 can be and preferably will be electrically isolated from the other elements of the gage in some applications and in some circuits.

FIG. 2 illustrates the equivalent electrical circuit for the capacitive pressure gage 10 shown in FIG. 1.

As stated above, the accurate measurement of the small capacitance differences developed with gages of the type illustrated and with the use of simple circuits known before this invention does present some problems. For example, at 400 cycles, the impedance of a 40 picofarad capacitor is about 10 megohms. Hence, either very high impedance circuits or higher frequencies are required. Also, as previously stated, previously known high frequency bridge circuits suffer from either excessive error, undesirable complexity if manual balancing is to be avoided, or both.

The circuit of FIG. 3 is a basic form of the present invention and serves as a simple and accurate readout circuit for differential capacitance gages. For simplicity in illustration, particular values will be assigned to the components of this figure with the understanding that they are illustrative of but one of many specific embodiments of the invention. The capacitive pressure gage 10 of FIGS. 1 and 2, for example, receives the output of an oscillator or other source of alternating current energy 26 through its third electrical connection 25 to the diaphragm 14. This output can be, by way of example, a 100 kilocycle sine wave of approximately 400 volts peak to peak. First electrical connection 21 extends from the first variable capacitor 23 to a first diode 27, and an electrical output line 28 connects this diode to an output terminal 29. Second and third diodes 32 and 33 are connected in series with each other across the first and second electrical connections 21 and 22 of the gage 10, and a line 34 extends from between these diodes to a common return line or ground line 35. A fourth diode 36 is connected between the first electrical connection 22 and the electrical output line 28 by a line 37. These four diodes can be type 1N2459, or some other suitable type. The general requirement is that they be capable of rapid recovery and have a low stored charge. A filter capacitor 40 between lines 28 and 35 can typically have a capacitance of one or two microfarads; and a load resistance 38 between these lines 28 and 35 can have a resistance of a few hundred ohms or less. A center reading meter 39 or some other suitable element for reading out or for being controlled by the output of the circuit of the invention is connected from the output terminal 29 to the return line 35.

In operation, as the oscillator output voltage changes from its negative peak to its positive peak, the current charging the first variable capacitor 23 flows through the first diode 27 and is delivered as a positive current to the filter capacitors 40 and the load resistance 38. The current charging the second variable capacitor 24 is drawn through the third diode 33 and lines 31 and 35.

When the oscillator output voltage changes from its positive peak to its negative peak, the current charging the first variable capacitor 23 flows through the second grounded diode 32, and the current charging the second variable capacitor 21 is delivered as a negative current to the filter capacitor 40 and the load resistance 38. When the pressures inside of the gage are balanced, or otherwise such that the diaphragm 14 is positioned so that capacitances between it and each of the plates 17 and 18 are the same, the positive and negative currents delivered to the filter capacitor 40 and the load resistance 38 will cancel, and the net D.C. current through the load resistance will be zero. When the gage is unbalanced, however, the magnitude and direction of the capacitance difference will be indicated by the magnitude and direction of the D.C. output current through the load resistance 38. Assuming the external load at 39 to be of low impedance, the resistor 38 may be eliminated if desired. If the load at 39 is a high impedance voltage sensing circuit, the value of the resistor 38 may be selected to give the desired voltage output for the currents generated by the circuit.

The current magnitudes are readily calculated. For example, with 50 picofarad first and second variable capacitances, a 100 kilocycle oscillator frequency, an oscillator output of 400 volts peak to peak and neglecting the conduction voltage drops of the diodes (typically of the order of 0.6 volt), the two opposing currents are:

$$(50 \times 10^{-12})(10^5)(400) = .002 \text{ amp.}$$

Similarly, assuming the load to be of low resistance and neglecting the voltage drop across it, capacitances of 40 and 60 picofarads would correspond to currents of 1.6 and 2.4 milliamperes. This 20 picofarad unbalance or difference in one direction would produce a net 0.8 milliampere positive current through the load resistance, and a 20 picofarad unbalance in the other direction would produce a net 0.8 milliampere negative current in the load resistance.

Thus, with a low impedance load, the D.C. current output of the circuit of FIG. 3 is essentially proportional to the product of the oscillator frequency, the oscillator output peak to peak voltage and the capacitance difference.

The apparent generator impedance of the circuit of FIG. 3 may be calculated by assuming a small voltage E at the output terminal 29. For balanced 50 picofarad variable capacitances 23 and 24, the rectified current due to the first capacitance element 23 is:

$$(50 \times 10^{-12})(10^5)(400-E)$$

and that due to the second variable capacitance element 24 is:

$$(50 \times 10^{-12})(10^5)(400+E)$$

The net current output is then $10^{-5} E$, corresponding to an apparent generator impedance of 100,000 ohms.

When the voltage on the output terminal 29 is negative and of the order of twice the diode forward conduction drop, current will flow from the output line 28 through the first and second diodes 27 and 32 to ground. Similarly, when the output voltage is positive and of the order of twice the diode forward conduction drop, current will flow to ground through the third and fourth diodes 33 and 36. The circuit output voltage is thus limited to the magnitudes less than twice the diode conduction voltage drop, and must be used as either a current source feeding into a low impedance load or as a generator of small voltages.

Considering the circuit further, stray capacitance between the connection 25 (and the gage body 11, as shown), and the ground will load the oscillator output but will not otherwise influence the circuit D.C. current output. The peak voltage on the two fixed gage plates 17 and 18, and hence across the diodes, is normally limited by the forward conduction voltage drop of the diodes. In the case of silicon junction diodes, for example, this voltage drop is approximately 0.5 to 0.7 volt. This limits the inverse voltage across the diodes to the order of 1 volt, and this makes the circuit relatively insensitive to the capacitance between the fixed plates and ground because of the low alternating voltage on the fixed plates with respect to ground.

Referring now to FIG. 4, a circuit is presented which is a modification of the circuit of FIG. 3 to allow the gage body 11, the flexible diaphragm 14 and the third electrical connection 25 to be grounded for mechanical convenience. The various elements of FIG. 3 are repeated in FIG. 4. In addition, a transformer 42 includes a primary winding 43 connected across oscillator 26, a first secondary winding 44 is connected between output line 28 and ground 35, and a second secondary winding 45 is connected between second and third diodes 32 and 33 and ground 35. Secondary windings 44 and 45 will normally be wound with an equal number of turns. The operation of the circuit of FIG. 4 is essentially similar to the operation of the circuit of FIG. 3.

What I claim is:

1. Capacitor comparator circuitry comprising first and second capacitors which are variable relative to each other, said first capacitor being connected for conduction between a first input terminal and a first junction and a said second capacitor being connected for conduction between said first input terminal and a third junction, first, second, third and fourth diodes all connected for conduction in the same direction in a closed series loop with a second input terminal on said loop between the first and second diodes, said first junction being on said loop between the second and third diodes, a second junction on said loop between the third and fourth diodes and said third junction being on said loop between the fourth and first diodes, a transformer having a primary with terminals for connection to an alternating current supply source and two secondary windings, one of said secondary windings being connected for conduction between said first and second input terminals and the other of said secondary windings being connected for conduction between said first input terminal and second junction, and a resistive load output in series with at least one of said secondary windings.

2. The circuitry of claim 1 further characterized in that said secondary windings are connected in common phase relationship.

3. The circuitry of claim 1 further characterized in that a capacitance is connected between the second junction and the second input terminal.

4. The circuitry of claim 1 further characterized in that said first input terminal is grounded.

5. The circuitry of claim 1 further characterized in that the plate of one of said first and second capacitors which is connected to said first input terminal is a diaphragm of a pressure transducer.

6. The circuitry of claim 5 further characterized in that said diaphragm is grounded.

7. Capacitor comparative circuitry comprising first and second capacitors at least one of which is variable, said first capacitor being connected for conduction between a first input terminal and a first junction and said second capacitor being connected for conduction between said first input terminal and a third junction; first, second, third and fourth rectifying elements connected for conduction in the same direction in a closed series loop with a second input terminal on said loop between the first and second rectifying elements, said first junction being on said loop between the second and third rectifying elements, a second junction on said loop between the third and fourth rectifying elements and said third junction being on said loop between the fourth and first rectifying elements, first alternating current excitation means coupled between said first and second input terminals and second alternating current excitation means coupled between said first input terminal and second junction for energizing said second junction substantially in phase with said second input terminal and a resistive load output in series with at least one of said excitation means.

8. The circuitry of claim 7 further characterized in that said second alternating current excitation means maintains substantially equal voltages at said second junction and said second input terminal.

9. Measurement circuitry comprising an electrical bridge having four rectifying arms connected for conduction in the same direction in a closed series loop and a pair of input junctions across one diagonal and a pair of output junctions across the other diagonal, a pair of series connected capacitors which are variable relative to each other connected across said input junctions and having a terminal between said capacitors, a pair of transformer windings coupled in phase between said terminal and said output junctions respectively, means to energize said transformer windings and a resistive load output connected in series between said terminal and one of said transformer windings.

10. The circuitry of claim 9 further characterized in that said transformer windings are bifilar wound and are energized by a separate transformer winding.

No references cited.

WALTER L. CARLSON, *Primary Examiner.*

E. KUBASIEWICZ, *Assistant Examiner.*